United States Patent [19]

Im et al.

[11] Patent Number: 5,805,696
[45] Date of Patent: Sep. 8, 1998

[54] ECHO CANCELLER ADAPTATION TECHNIQUE

[75] Inventors: Gi-Hong Im; Burton Reuben Saltzberg, both of Middletown; Jean-Jacques Werner, Holmdel, all of N.J.

[73] Assignee: Lucent Technologies, Inc., Murray Hill, N.J.

[21] Appl. No.: 762,554

[22] Filed: Dec. 9, 1996

[51] Int. Cl.[6] .............................. H04M 1/00; G06F 17/10; H04B 3/20
[52] U.S. Cl. ...................... 379/411; 379/406; 379/410; 364/724.19; 364/724.02; 381/66
[58] Field of Search ...................................... 379/410, 411, 379/406; 364/724.02, 724.19; 381/68.2, 68.1, 71, 66

[56] References Cited

U.S. PATENT DOCUMENTS 5,027,393  6/1991  Yamamura et al. ..................... 379/410
5,363,441  11/1994  Feiner et al. ........................... 379/411
5,428,604  6/1995  Fuda ....................................... 370/32.1

*Primary Examiner*—Krista Zele
*Assistant Examiner*—Charles N. Appiah

[57] ABSTRACT

A device for providing conferencing communications. The device comprises: a summing circuit for forming a signal sum equal to a sum of signals received from at least three information signal sources along with an echo compensation signal, the signal received from each information source including echoes and the signal sum including an aggregation of such echoes; an adaptive filter having an input and an output, the input being solely responsive to the signal sum and the output being only coupled to the summing circuit, the filter forming the echo compensation signal which is an estimate of the aggregation of echoes; and a low level training sequence generator having an amplitude less than a predetermined level. The adaptive filter has coefficients whose respective values are varied in response to a training sequence comprising a plurality of a priori known values supplied by the low level training sequence generator and the predetermined level is below that of the signal received from the each information source.

15 Claims, 2 Drawing Sheets

ECHO CANCELLER ADAPTATION TECHNIQUE

FIELD OF THE INVENTION

This invention relates to a communication systems, and more particularly to reducing echoes in a conference communication system.

BACKGROUND OF THE INVENTION

The problems of echoes is a universal problem in point-to-point and conferencing communications. Conferencing connects three or more people into one communication channel. The signals are typically voice but may include multi-media communications as well. Echoes are a major problem in conference communications. When an increasing number of circuits are connected in a conference call, the cumulative effect of the plurality of echo paths can severely degrade the quality of the communication, rendering them unintelligible. The introduction of attenuation into each circuit to solve this problem limits the maximum number of people that may be connected. Providing echo cancellation through circuitry in each of the interconnections is costly to implement. U. S. Pat. No. 5,363,441, entitled "Technique For Reducing Echoes In Conference Communications" issued on Nov. 8, 1994 to Alexander Feiner et al, discloses the use of an echo estimating filter connected to a signal combiner in a conference bridge for reducing echoes in a conference call. The presence of the training sequence interferes with the information signal communications.

There is a discontinuity with respect to the training sequence with the prior art, when it is necessary to separate the training sequence from conversation.

SUMMARY OF THE INVENTION

In accordance with the present invention we have invented a conference bridge which includes an echo canceller that is continuously adapted. In an embodiment of the present invention, a device for providing conferencing communications comprises: a summing circuit for forming a signal sum equal to a sum of signals received from at least three information signal sources along with an echo compensation signal, the signal received from each information source including echoes and the signal sum including an aggregation of such echoes; an adaptive filter having an input and an output, the input being solely responsive to the signal sum and the output being only coupled to the summing circuit, the filter forming the echo compensation signal which is an estimate of the aggregation of echoes; and a low level training sequence generator having an amplitude less than a predetermined level. The adaptive filter has coefficients whose respective values are varied in response to a training sequence comprising a plurality of a priori known values supplied by the low level training sequence generator and the predetermined level is below that of the signal received from the each information source.

DESCRIPTION OF THE DRAWINGS

The present invention is described in detail below in conjunction with the drawings, of which.

DETAILED DESCRIPTION OF VARIOUS ILLUSTRATIVE EMBODIMENTS

Before describing the present invention, some background information will be described. U.S. Pat. No. 5,363,441, entitled "Technique For Reducing Echoes In Conference Communications" issued on Nov. 8, 1994 to Alexander Feiner et al, is incorporated herein by reference. This patent discloses the use of an echo estimating filter connected to a signal combiner in a conference bridge for reducing echoes in a conference call. The presence of the training sequence interferes with the information signal communications and must be carefully timed to occur at start up and other predetermined times. This however imposes a limitation on the ability of the system to effectively and efficiently adapt the echo estimating filter.

Figure 1:
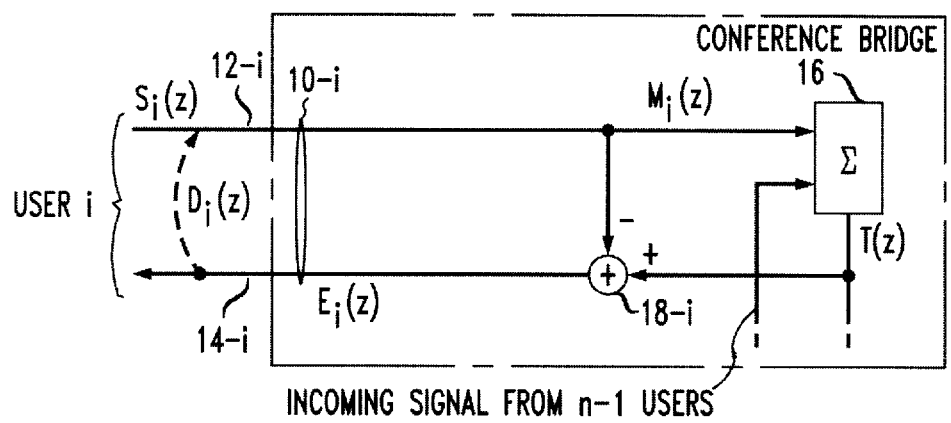
FIG. 1 shows a block schematic diagram of a conference bridge.

Referring to FIG. 1, there is shown a block schematic diagram of a conference bridge. The conferencing communication system has capabilities for n users, where n is greater than or equal to 3. Each of the n users is connected to the conference bridge through one of n communication links 10-1 through 10-$n$. For the ith user the communication link 10-$i$ includes a corresponding incoming signal path 12-$i$ and a corresponding outgoing signal path 14-$i$. A signal combiner 16 in the bridge unit is connected to each of the n incoming signal paths 12-1 through 12-$n$ and provides an output signal, T(z), to each of the n outgoing signal paths 14-1 through 14-$n$. It is assumed that there is no signal loss introduced by the conference bridge. The output signal T(z) is equal to the sum of the signals on all n incoming signal paths 12-1 through 12-n. A signal subtractor, designated 18-$i$, is disposed in the corresponding outgoing signal path 14-$i$. Each signal subtractor 18-$i$ subtracts any signal coupled on the incoming signal path 12-$i$ of a corresponding communication link. 10-$i$ from the composite signal coupled to the corresponding outgoing signal path 14-$i$ of that link. As a result, each of the n users hears the speech of all of the other users.

Figure 2:
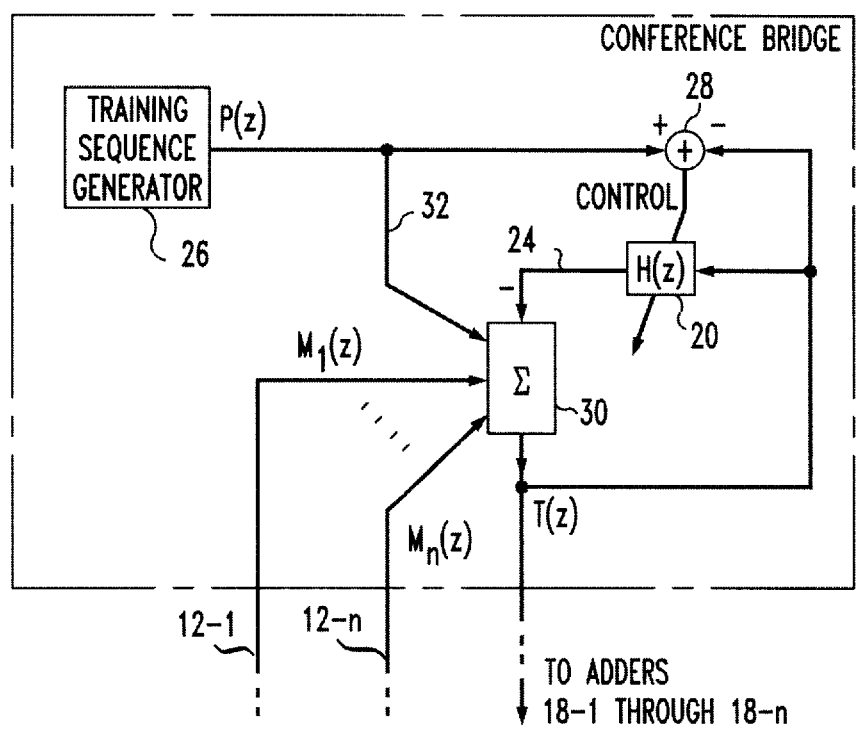
FIG. 2 shows a block diagram of the prior art adaptive echo estimating filter.

FIG. 2 shows a configuration with an adaptive echo estimating filter 20. The echo estimating filter 20 supplies an output signal to combiner input path 24. Echo estimating filter 20 is adapted using well known training sequence techniques wherein each sequence includes a plurality of a priori known signals. Typically, each sequence is transmitted at predetermined times, such as at system start-up and at predetermined times thereafter. At each such time, only the training sequence is transmitted. Thus, these time intervals must be reserved in advance so as to assure the absence of signals transmitted by any of the n users. The training sequence generator 26 provides a training sequence which has a z transform designated as P(z) at each predetermined time. Adder 28 provides a control signal equal to the algebraic difference between P(z) and T(z). This control signal varies the weighting coefficients of the echo estimating filter 20 and thus varies the echo replica provided by the echo estimating filter 20. The signal combiner 30 receives the training sequence at each predetermined time through input link 32.

The echo estimating filter 20 is noncontinuously adapted only during training sequence transmissions. As a result, in the time periods between training sequence intervals, the echo replica required may change due to a variety of factors, including the addition or deletion in the number of users, variations in the electrical characteristics of the communications paths and other factors.

Figure 3:
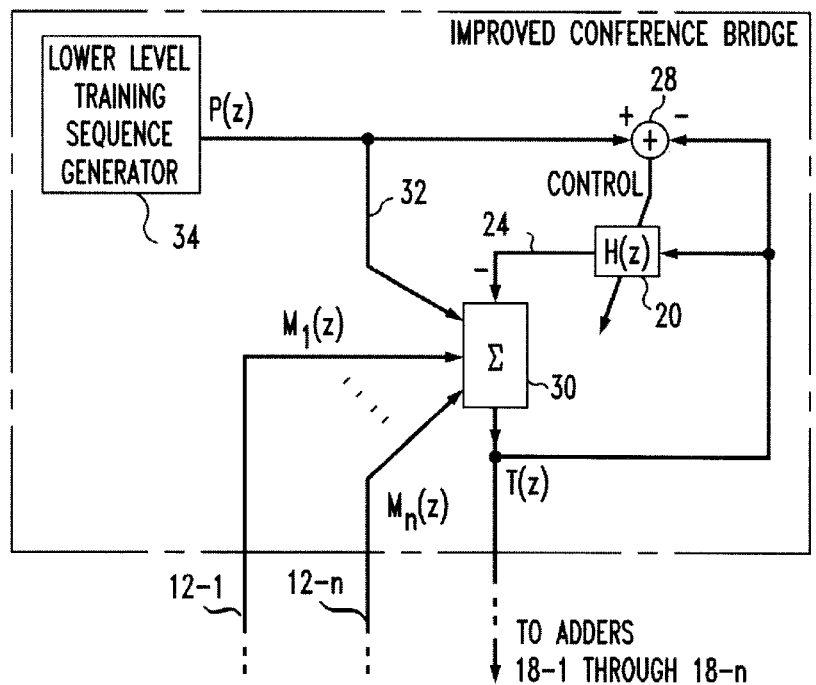
FIG. 3 shows a block diagram of the present invention utilizing an adaptive echo estimating filter; and, FIG. 4 shows a flow chart of the continuous adaptation technique.

In contrast to the above described existing techniques and what would be expected, it is possible to have a training sequence transmission and echo canceler adaptation which are both continuous which is shown in FIG. 3. This is accomplished by having the echo canceler filter 20 adapted using a training sequence which is produced by the low level training sequence generator 34 which has an amplitude level that is maintained at a predetermined level below that of an information signal. This predetermined level is such that the presence of the training sequence does not interfere with information signal communications. A reasonable amount for the predetermined level is 30 dB although smaller levels as well as larger levels may be utilized. Structures are designated by the same reference numerals and operate in the same manner as described for FIG. 2 except for the above described low level training sequence generator 34 and its interaction with the echo canceler filter 20 and information signal communications.

Figure 4:
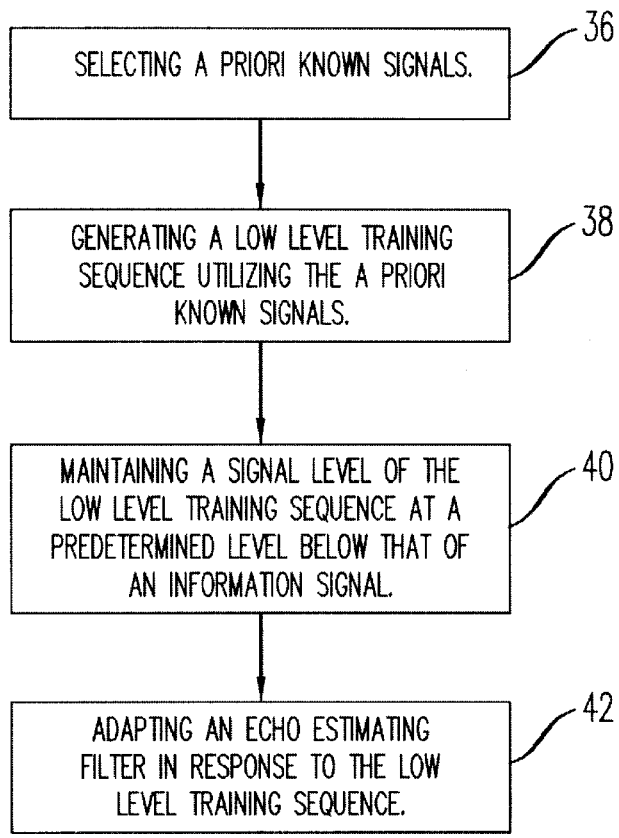

Referring to FIG. 4 there is shown a flow chart of the functioning of the present invention shown in FIG. 3. A priori known signals are selected in step 36. The a priori known signals are utilized to generate a training sequence in step 38. The signal level of the training sequence is maintained at a predetermined level below that of an information signal in step 40. The echo estimating filter is adapted in step 42 in response to the training sequence.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A device for providing conferencing communications comprising:

a summing circuit for forming a signal sum equal to a sum of signals received from at least three information signal sources along with an echo compensation signal, the signal received from each information source including echoes and said signal sum including an aggregation of such echoes;

an adaptive filter having an input and an output, said input being solely responsive to said signal sum and said output being only coupled to said summing circuit, said filter forming said echo compensation signal which is an estimate of said aggregation of echoes; and, a low level training sequence generator having an amplitude less than a predetermined level;

wherein said adaptive filter has coefficients whose respective values are varied in response to a training sequence comprising a plurality of a priori known values supplied by said low level training sequence generator, said predetermined level is below that of the signal received from said each information source and said low level training sequence generator operates to supply said training sequence continuously during conference communications without interference with the signal received from said each information source.

2. The device as recited in claim 1 further comprising means for varying values of said coefficients as a function of a maximum signal received from said at least three information signal sources at each of a plurality of times.

3. The device as recited in claim 2 wherein said function is also a function of a signal returned to the signal source supplying the maximum one of the signals received at each of said plurality of times.

4. A device for providing conferencing communications for at least three users, each user capable of transmitting an information signal through a transmit link and receiving an information signal through a receive link comprising:

a summing circuit for forming a signal sum equal to a sum of signals received on said transmit link from at least three information signal sources along with an echo compensation signal, the signal received from each information source including echoes and said signal sum including an aggregation of such echoes, said signal sum coupled to each receive link;

an adaptive filter having an input and an output, said input being solely responsive to said signal sum and said output being only coupled to said summing circuit, said filter forming said echo compensation signal which is an estimate of said aggregation of echoes; and, a low level training sequence generator having an amplitude less than a predetermined level;

wherein said adaptive filter has coefficients whose respective values are varied in response to a training sequence comprising a plurality of a priori known values supplied by said low level training sequence generator, said predetermined level is below that of the signal received from said each information source and said low level training sequence generator operates to supply said training sequence continuously during conference communications without interference with the signal received from said each information source.

5. The device as recited in claim 4 further comprising means for varying values of said coefficients as a function of a maximum signal received from said at least three information signal sources at each of a plurality of times.

6. The device as recited in claim 5 wherein said function is also a function of a signal returned to the signal source supplying the maximum one of the signals received at each of said plurality of times.

7. An improved conference bridge for providing conferencing communications, the conference bridge comprising a summing circuit for forming a signal sum equal to a sum of signals received from at least three information signal sources along with an echo compensation signal, the signal received from each information source including echoes and said signal sum including an aggregation of such echoes, and an adaptive filter having an input and an output, said input being solely responsive to said signal sum and said output being only coupled to said summing circuit, said filter forming said echo compensation signal which is an estimate of said aggregation of echoes, wherein said improvement comprising:

a low level training sequence generator having an amplitude less than a predetermined level;

wherein said adaptive filter has coefficients whose respective values are varied in response to a training sequence comprising a plurality of a priori known values supplied by said low level training sequence generator, said predetermined level is below that of the signal received from said each information source and said low level training sequence generator operates to supply said training sequence continuously during conference communications without interference with the signal received from said each information source.

8. The device as recited in claim 7 further comprising means for varying values of said coefficients as a function of a maximum signal received from said at least three information signal sources at each of a plurality of times.

9. The device as recited in claim 9 wherein said function is also a function of a signal returned to the signal source supplying the maximum one of the signals received at each of said plurality of times.

10. A device for providing conferencing communication with continuously adapted echo cancellation comprising:

a conference bridge for forming a signal sum equal to a sum of signals received from at least three information signal sources along with an echo compensation signal, the signal received from each information source including echoes and said signal sum including an aggregation of such echoes;

an echo canceler adaptive filter having an input and an output, said input being solely responsive to said signal sum and said output being only coupled to said summing circuit, said echo cancellation adaptive filter forming said echo compensation signal which is an estimate of said aggregation of echoes; and, a low level training sequence generator having an amplitude less than a predetermined level;

wherein said echo canceling adaptive filter has coefficients whose respective values are varied in response to a training sequence comprising a plurality of a priori known values supplied by said low level training sequence generator, said predetermined level is below that of the signal received from said each information source and said low level training sequence generator operates to supply said training sequence continuously during conference communications without interference with the signal received from said each information source.

11. The device as recited in claim 10 further comprising means for varying values of said coefficients as a function of a maximum signal received from said at least three information signal sources at each of a plurality of times.

12. The device as recited in claim 11 wherein said function is also a function of a signal returned to the signal source supplying the maximum one of the signals received at each of said plurality of times.

13. An improved conference bridge for providing conferencing communications, wherein said improvement comprising:

a low level training sequence generator having an amplitude less than a predetermined level;

wherein an adaptive filter has coefficients whose respective values are varied in response to a training sequence comprising a plurality of a priori known values supplied by said low level training sequence generator, said predetermined level is below that of a signal received from each information source and said low level training sequence generator operates to supply said training sequence continuously during conference communications without interference with the signal received from said each information source.

14. The device as recited in claim 13 further comprising means for varying values of said coefficients as a function of a maximum signal received from at least three information signal sources at each of a plurality of times.

15. The device as recited in claim 14 wherein said function is also a function of a signal returned to the signal source supplying the maximum one of the signals received at each of said plurality of times.

* * * * *